United States Patent
Kang

(10) Patent No.: US 7,437,433 B2
(45) Date of Patent: Oct. 14, 2008

(54) METHOD FOR BATCH REGISTRATION OF INTEGRATED DIGITAL LOOP CARRIER SUBSCRIBER USING PROGRAM LOADED DATA OF EXCHANGE, AND ELEMENT MANAGEMENT SYSTEM SERVER FOR THE SAME

(75) Inventor: Young-Hyun Kang, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 867 days.

(21) Appl. No.: 10/743,749

(22) Filed: Dec. 24, 2003

(65) Prior Publication Data

US 2004/0151205 A1 Aug. 5, 2004

(30) Foreign Application Priority Data

Jan. 30, 2003 (KR) ...................... 10-2003-0006229

(51) Int. Cl.
- G06F 15/177 (2006.01)
- G06F 15/16 (2006.01)
- H04L 12/40 (2006.01)

(52) U.S. Cl. ........................ 709/220; 709/201; 709/203; 370/438; 379/26

(58) Field of Classification Search ................ 709/220; 370/348, 438; 395/155; 379/26
See application file for complete search history.

(56) References Cited

U.S. PATENT DOCUMENTS

| | | | |
|---|---|---|---|
| 5,564,003 A * | 10/1996 | Bell et al. .................... 715/747 |
| 5,915,092 A | 6/1999 | Morita et al. |
| 6,023,724 A | 2/2000 | Bhatia et al. |
| 6,028,848 A | 2/2000 | Bhatia et al. |
| 6,058,104 A | 5/2000 | Snelling et al. |
| 6,263,016 B1 | 7/2001 | Bellenger et al. |
| 6,310,873 B1 | 10/2001 | Rainis et al. |
| 6,320,867 B1 | 11/2001 | Bellenger et al. |
| 6,332,163 B1 | 12/2001 | Bowman-Amuah |
| 6,363,411 B1 | 3/2002 | Dugan et al. |
| 6,393,481 B1 | 5/2002 | Deo et al. |
| 6,404,761 B1 | 6/2002 | Snelling et al. |
| 6,418,131 B1 | 7/2002 | Snelling et al. |
| 6,519,571 B1 | 2/2003 | Guheen et al. |
| 2002/0078130 A1 * | 6/2002 | Thornton et al. ............ 709/201 |
| 2003/0023707 A1 * | 1/2003 | Ryan .......................... 709/220 |
| 2004/0136394 A1 * | 7/2004 | Onno et al. ................. 370/438 |

* cited by examiner

*Primary Examiner*—John Follansbee
*Assistant Examiner*—Karen C Tang
(74) *Attorney, Agent, or Firm*—Robert E. Bushnell, Esq.

(57) ABSTRACT

In a method for batch registration of an integrated digital loop carrier (IDLC) subscriber using a program loaded data (PLD) of an exchange, an operator opens a program loaded data (PLD) file of an exchange selected by a client terminal accessing through a network, extracts subscriber information from the program loaded data (PLD) file, designs and designates a shelf for accepting subscribers, transmits a command for registering subscribers in the designated shelf, performs batch registration of subscribers for the shelf, receives verification information for registration of subscribers from the shelf, and displays the result on a graphical user interface of the client terminal. As a result, when a semielectronic exchange is replaced by an access media gateway, batch registration of an integrated digital loop carrier (IDLC) subscriber is performed by using the program loaded data (PLD) of the exchange.

9 Claims, 8 Drawing Sheets

FIG. 4

| SHELF ID | SLU SOLT | TOTAL PORT | SUBSCRIBER | SUCCESS | FAILURE |
|---|---|---|---|---|---|
| SYS2_CS | 0 | 0 | 0 | 0 | 0 |
| SYS2_ES1 | 0 | 0 | 0 | 0 | 0 |
| SUWONIT03 | 16 | 1024 | 0 | 0 | 0 |
| SYS2_ES2 | 0 | 0 | 0 | 0 | 0 |
| SYS2_ES3 | 0 | 0 | 0 | 0 | 0 |
| TOTAL | 16 | 1024 | 0 | 0 | 0 |

NEW DESIGN | SAVE | END

FIG. 5

```
00/0001 | 00 | 2752000/00001 | 823-9254 | 00000001 | without | 082 | without | false | international | normal | false | false | without |
00/0003 | 00 | 2752000/00003 | 823-6141 | 00000003 | without | 081 | without | false | international | normal | false | false | without |
00/0004 | 00 | 2752000/00004 | 823-4499 | 00000004 | without | 081 | without | false | toll | normal | false | false | without |
00/0006 | 00 | 2752000/00006 | 823-9140 | 00000006 | without | 081 | without | false | international | normal | false | false | without |
00/0007 | 00 | 2752000/00007 | 822-7401 | 00000007 | without | 081 | without | false | international | SER | false | false | without |
00/0008 | 00 | 2752000/00008 | 822-2291 | 00000008 | without | 081 | without | false | international | normal | false | false | without |
00/0009 | 00 | 2752000/00009 | 822-0675 | 00000009 | without | 081 | without | false | international | normal | false | false | without |
00/0010 | 00 | 2752000/00010 | 823-4963 | 00000010 | without | 081 | without | false | international | normal | false | false | without | CFU |
00/0011 | 00 | 2752000/00011 | 823-9694 | 00000011 | without | 081 | without | false | international | normal | false | false | without | CAW |
00/0012 | 00 | 2752000/00012 | 823-9981 | 00000012 | without | 081 | without | false | international | normal | false | false | without | CFU |
00/0013 | 00 | 2752000/00013 | 823-7121 | 00000013 | without | 081 | without | false | international | normal | false | false | without |
00/0014 | 00 | 2752000/00014 | 822-1217 | 00000014 | without | 081 | without | false | international | normal | false | false | without |
00/0015 | 00 | 2752000/00015 | 824-9209 | 00000015 | without | 081 | term_bar | false | toll | coin | false | false | without | PULSE |
00/0016 | 00 | 2752000/00016 | 822-0974 | 00000100 | without | 081 | without | false | international | normal | false | false | without | CFU |
00/0017 | 00 | 2752000/00017 | 823-1506 | 00000101 | without | 081 | without | false | international | normal | false | false | without |
00/0018 | 00 | 2752000/00018 | 823-9454 | 00000102 | without | 081 | without | false | international | normal | false | false | without | CAW | CFU |
00/0019 | 00 | 2752000/00019 | 823-6811 | 00000103 | without | 081 | without | false | international | normal | false | false | without | CFU |
00/0020 | 00 | 2752000/00020 | 822-0044 | 00000104 | without | 081 | without | false | international | SER | false | false | without |
```

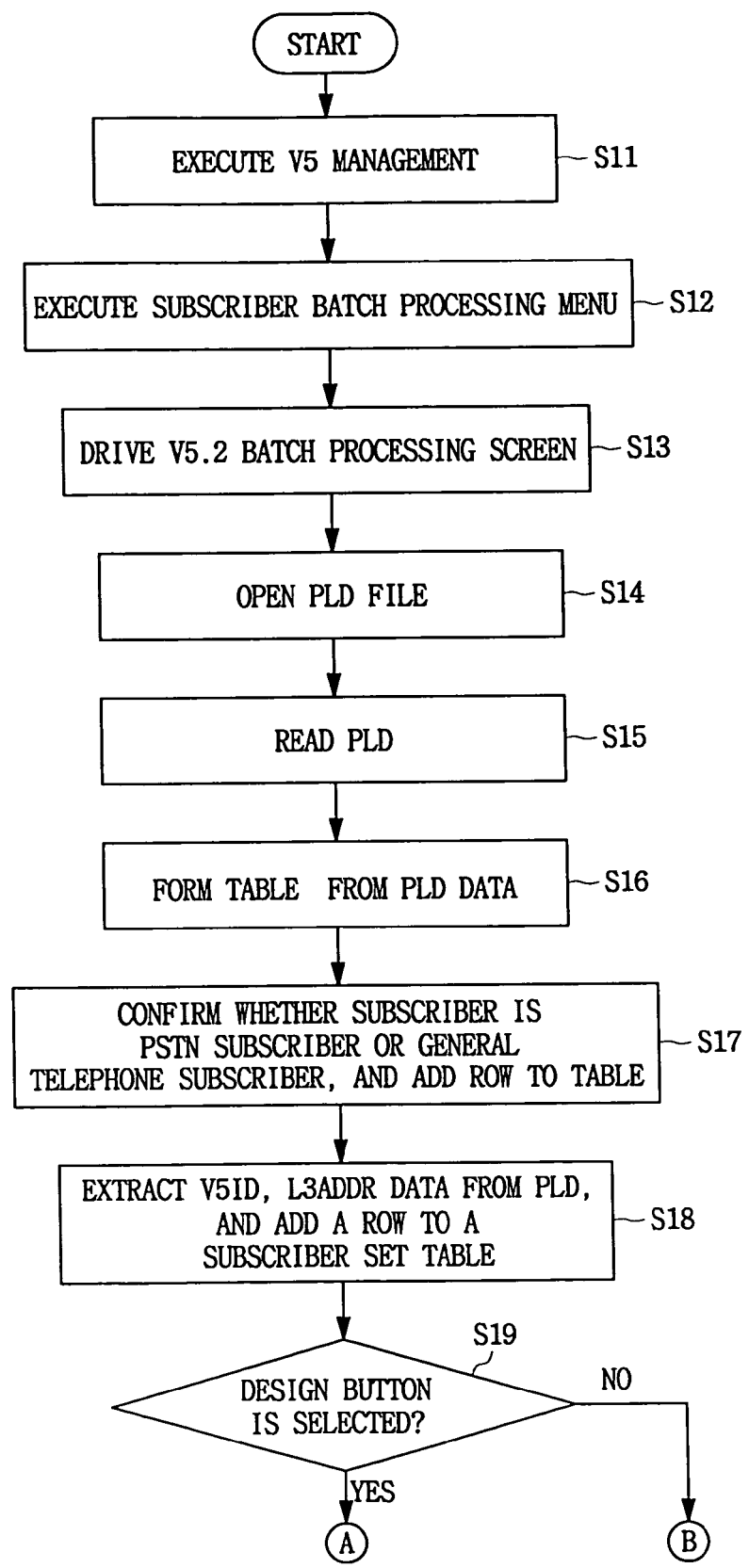

METHOD FOR BATCH REGISTRATION OF INTEGRATED DIGITAL LOOP CARRIER SUBSCRIBER USING PROGRAM LOADED DATA OF EXCHANGE, AND ELEMENT MANAGEMENT SYSTEM SERVER FOR THE SAME

CLAIM OF PRIORITY

This application makes reference to, incorporates the same herein, and claims all benefits accruing under 35 U.S.C. §119 from an application for METHOD FOR BATCH REGISTRATION OF INTEGRATED DIGITAL LOOP CARRIER SUBSCRIBER USING PROGRAM LOADED DATA OF EXCHANGE, AND ELEMENT MANAGEMENT SYSTEM SERVER FOR THE SAME earlier filed in the Korean Intellectual Property Office on 30 Jan. 2003 and there duly assigned Ser. No. 2003-6229.

BACKGROUND OF THE INVENTION

1. Technical Field

The present invention relates to a method for batch registration of an integrated digital loop carrier (IDLC) subscriber using program loaded data (PLD) of an exchange, and an element management system (EMS) server for the same. More particularly, the invention relates to a method for batch registration of an IDLC subscriber using PLD of an exchange which can automatically open thousands to scores of thousands of IDLC subscribers which will be accepted in an access media gateway by using PLD information generated in the exchange, and to an EMS server for the same purpose.

2. Related Art

An IDLC, which is one of the methods for building a switched network, combines an exchange and subscribers in E1 units, and directly connects them through transmission equipment, such as a fiber loop carrier (FLC).

The V5.2 protocol of the IDLC was recommended in 1995 by the European Telecommunication Standard (ETS) and the International Telecommunications Union-Telecommunication Standardization Sector (ITU-T) in the USA. It has a 4-to-1 concentration function, and thus processes 120 subscribers per V5.2 subscriber board.

The IDLC is economically advantageous, suitable for high speed intelligent telephone service, reduces expenses for building a switched network by at least 30-40% relative to the expenses of a universal digital loop carrier (UDLC), which is a general method for building a telephone switched network, and rapidly starts a service.

In addition, the IDLC minimizes the number of subscriber boards adhered to each telephone subscriber in an exchange system of a telephone office, which can cut down expenses for the subscriber boards. The size of a subscriber rack also decreases so that the top surface of the subscriber rack can be variously used.

The IDLC can efficiently build a switched network in countries where subscriber lines have not been sufficiently installed, such as China, Vietnam and Southeast Asia. It is thus possible to export related technology and equipment. As the IDLC is actively introduced to the telephone switched network, a related equipment market is expected to grow remarkably.

On the other hand, the V5 interface which corresponds to the IDLC interface is a standard service node interface (SNI) between an access network (AN) and a digital local exchange (LE), and is recommended by the European Telecommunications Standards Institute (ETSI).

The V5 interface defines electrical physical properties, protocol requirements and procedure requirements in order to obtain signaling and switching capability so as to provide public switched telephone network (PSTN) and integrated services digital network (ISDN) services through a standard interface. The V5 interface is designed to connect all service types, below 2 Mbps and existing in the current AN, to a service node through a single interface.

V5 group protocols have been standardized into V5.1 and V5.2, including an E1 level physical layer in layer 1, a data link layer under Q.920 and Q.921 in layer 2, and a network layer in layer 3.

The V5.1 interface performs accesses in call units by static multiplexing in one 2048 kbit/s link by using a PSTN protocol and a control protocol, which are layer 3 protocols. Conversely, the V5.2 interface includes a PSTN protocol, a BCC protocol, a control protocol, a link control protocol and a protecting protocol, and provides a concentration function by dynamic multiplexing in a maximum of sixteen 2048 kbit/s links by using the BCC protocol.

The V5 interface does not have a back-to-back structure as in a general digital loop carrier (DLC) system, but has a structure wherein a protocol stack is mounted between the ends after removing a subscriber board of an LE and a channel bank of an optical transmission system. Accordingly, an MDF to which lines are connected is removed so as to obtain space in a central office.

On the other hand, the PLD information is subscriber information stored in the exchange. If the exchange is replaced or installed, the subscribers must be rapidly and separately accepted or transferred. Even if a skilled operator works for it, it will take a few hours to a few days to carry out the task, and the subscribers cannot communicate during that time period.

Sequential steps of a related method for registration of an IDLC subscriber are as follows. In order to open subscribers, an operator receives subscriber information inputted to an exchange in the form of a document or through a cable, and selects subscriber set data. The operator creates a command for adding the subscriber, and transmits it to corresponding network elements (for example, access media gateway or subscriber transmission device). When signals are received from the corresponding network elements reporting success of the command, the operator confirms existence of another provision item, and adds a succeeding subscriber.

If the skilled operator manually opens the subscribers one by one, it takes 5 hours to set up 512 subscribers. In addition, a verification process further increases time consumption. The operator may make mistakes which cause errors. As a result, a lot of time and manpower are required to open thousands to scores of thousands of subscribers.

SUMMARY OF THE INVENTION

It is, therefore, an object of the present invention to provide a method and an EMS server for batch registration of an IDLC subscriber using a PLD of an exchange, which method can easily and rapidly open subscribers and prevent mistakes of an operator.

To achieve the above object, there is provided a method for batch registration of an IDLC subscriber using a PLD of an exchange, comprising steps of: opening a PLD file of an exchange selected by a client terminal accessing through a network, and listing and displaying information relative to subscribers included in the PLD file on a graphical user interface of the client terminal; displaying shelf information of an IDLC network element which will accept the subscribers included in the PLD file on the graphical user interface of the client terminal; receiving a specific shelf range of the displayed network element, and displaying it on the graphical user interface of the client terminal, when a mode for designing subscriber constitution by shelves is selected; receiving a list of the subscribers who will be accepted in the shelf within a designated range among the listed subscribers, and displaying it on the graphical user interface of the client terminal; and transmitting a command for registering the subscribers within the designated range in the shelf within the designated range, performing batch registration of a subscriber for the corresponding shelf, receiving verification information for the subscriber registration from the corresponding shelf, and displaying the result on the graphical user interface of the client terminal.

According to another aspect of the invention, there is provided a recorded media which is executed by a computer device, and which includes an electromagnetically-stored program for performing a method for batch registration of an IDLC subscriber using a PLD of an exchange, the method including the steps of: opening a PLD file of an exchange selected by a client terminal accessing through a network, and listing and displaying information relative to subscribers included in the PLD file on a graphical user interface of the client terminal; displaying shelf information of an IDLC network element which will accept the subscribers included in the PLD file on the graphical user interface of the client terminal; receiving an arbitrary range of shelf in the displayed network element, and displaying it on the graphical user interface of the client terminal, when a mode for designing subscriber constitution by shelves is selected; receiving a list of the subscribers who will be accepted in the shelf within a designated range among the listed subscribers, and displaying it on the graphical user interface of the client terminal; and transmitting a command for registering subscribers within the designated range in the shelf within the designated range, performing batch registration of a subscriber for the corresponding shelf, receiving verification information for the registration of the subscriber from the corresponding shelf, and displaying the result on the graphical user interface of the client terminal.

According to another aspect of the invention, there is provided an element management system server performing the functions of: storing at least one exchange PLD, opening a PLD file of an exchange selected by a client terminal linked to the server through a network, and listing and displaying information relative to subscribers included in the PLD file on a graphical user interface of the client terminal according to input information from the client terminal; displaying shelf information relative to an IDLC network element which will accept the subscribers on the graphical user interface of the client terminal; receiving a shelf range in the displayed network element, and displaying it on the graphical user interface of the client terminal, when a mode for designing subscriber constitution by shelves is selected; receiving a list of the subscribers who will be accepted in the shelf within a designated range among the subscribers, and displaying it on the graphical user interface of the client terminal; and transmitting a command for registering the subscribers within the designated range in the shelf within the designated range, performing batch registration of a subscriber for the corresponding shelf, receiving verification information for the registration of the subscriber from the corresponding shelf, and displaying the result on the graphical user interface of the client terminal.

The following patents are considered to be generally pertinent to the present invention, but are burdened by the disadvantages set forth above: U.S. Pat. No. 5,915,092 to Morita et al., entitled COMMUNICATIONS CONTROL SYSTEM FOR TRANSFERRING COMMANDS/STATUS DATA IN BATCH BETWEEN PROCESSORS UTILIZING TRANSMITTING PROCESSOR'S COMMAND ACTIVATION ORDER AND RECEIVING PROCESSOR'S ACCESS CONTROL, issued on Jun. 22, 1999; U.S. Pat. No. 6,519,571 to Guheen et al., entitled DYNAMIC CUSTOMER PROFILE MANAGEMENT, issued on Feb. 11, 2003; U.S. Pat. No. 6,418,131 to Snelling et al., entitled SPECTRUM MONITORING FOR PSTN SUBSCRIBERS, issued on Jul. 9, 2002; U.S. Pat. No. 6,404,761 to Snelling et al., entitled COMMUNICATIONS WEBS WITH PERSONAL COMMUNICATIONS LINKS FOR PSTN SUBSCRIBERS, issued on Jun. 11, 2002; U.S. Pat. No. 6,363,411 to Dugan et al., entitled INTELLIGENT NETWORK, issued on Mar. 26, 2002; U.S. Pat. No. 6,332,163 to Bowman-Amuah, entitled METHOD FOR PROVIDING COMMUNICATION SERVICES OVER A COMPUTER NETWORK SYSTEM, issued on Dec. 18, 2001; U.S. Pat. No. 6,320,867 to Bellenger et al., entitled METHOD AND APPARATUS FOR HIERARCHICAL MANAGEMENT OF SUBSCRIBER LINK TRAFFIC ON DIGITAL NETWORKS, issued on Nov. 20, 2001; U.S. Pat. No. 6,310,873 to Rainis et al., entitled INTERNET TELEPHONY DIRECTORY SERVER, issued on Oct. 30, 2001; U.S. Pat. No. 6,263,016 to Bellenger et al., entitled METHODS FOR INTERFACING A SUBSCRIBER LINK TO DIGITAL NETWORKS, issued on Jul. 17, 2001; U.S. Pat. No. 6,058,104 to Snelling et al., entitled COMMUNICATIONS WEBS FOR PSTN SUBSCRIBERS, issued on May 2, 2000; U.S. Pat. No. 6,028,848 to Bhatia et al., entitled APPARATUS AND METHODS FOR USE THEREIN FOR AN ISDN LAN MODEM UTILIZING INTERNAL DNS AND DHCP SERVERS FOR TRANSPARENT TRANSLATION OF LOCAL HOST NAMES TO IP ADDRESSES, issued on Feb. 22, 2000; U.S. Pat. No. 6,023,724 to Bhatia et al., entitled APPARATUS AND METHODS FOR USE THEREIN FOR AN ISDN LAN MODEM THAT DISPLAYS FAULT INFORMATION TO LOCAL HOSTS THROUGH INTERCEPTION OF HOST DNS REQUEST MESSAGES, issued on Feb. 8, 2000; and U.S. Pat. No. 6,393,481 to Deo et al., entitled METHOD AND APPARATUS FOR PROVIDING REAL-TIME CALL PROCESSING SERVICES IN AN INTELLIGENT NETWORK, issued on May 21, 2002.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is an exemplary view of a graphical user interface for performing a design mode in FIG. 3;

FIG. 5 is an exemplary view of a data source as one example of the PLD of FIG. 3; and FIGS. 6A to 6C are flowcharts showing sequential steps of the method for batch registration of an IDLC subscriber using the PLD of the exchange in accordance with the preferred embodiment of the present invention.

DETAILED DESCRIPTION OF THE PREFERRED EMBODIMENT

Figure 1:
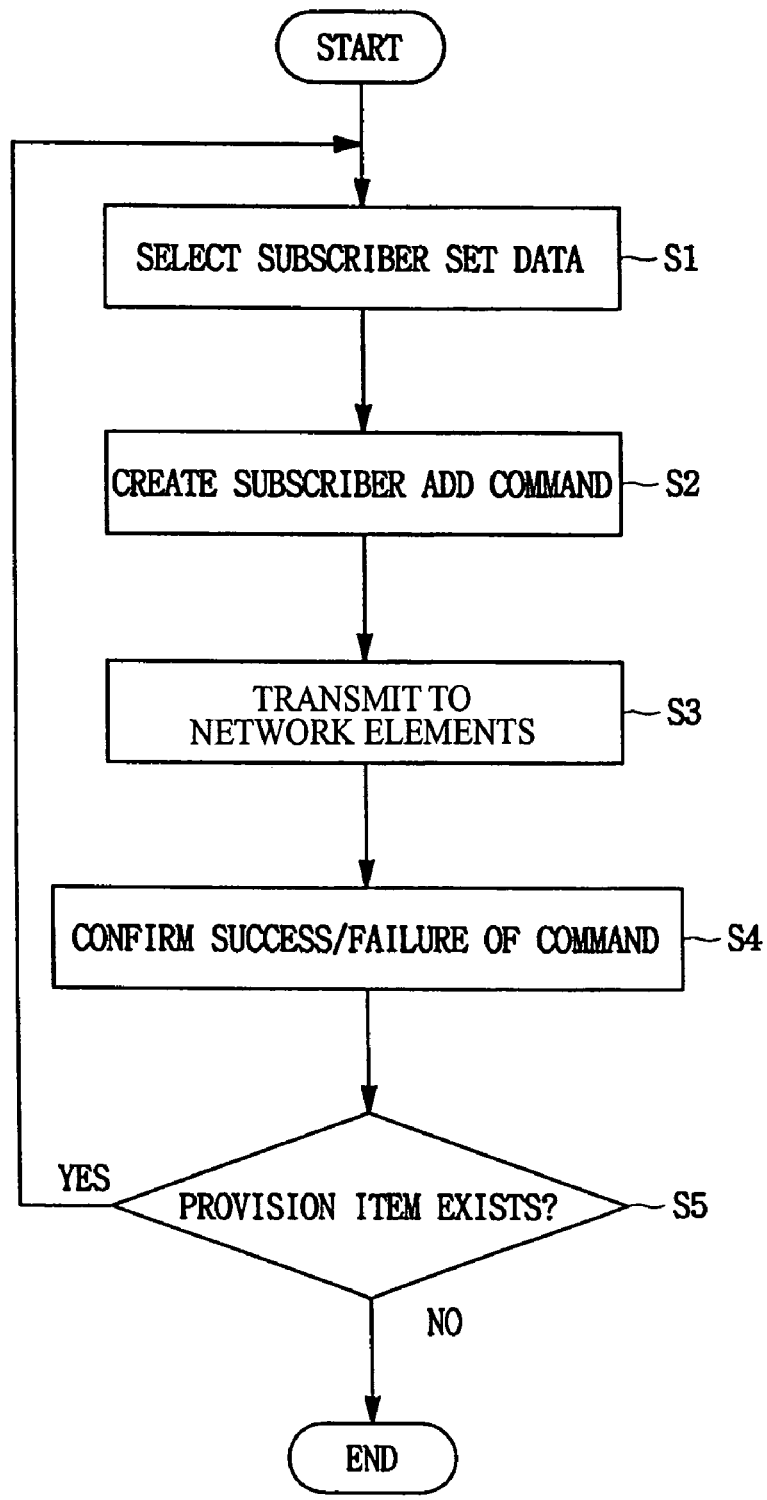
FIG. 1 is a flowchart showing sequential steps of a related method for registration of an IDLC subscriber.

A preferred embodiment of the present invention will now be described with reference to the accompanying drawings. In the following description, same drawing reference numerals are used for the same elements even in different drawings. The matters defined in the description, such as the detailed construction and elements of a circuit, are merely provided to assist in a comprehensive understanding of the invention. Thus, it is apparent that the present invention can be carried out without those defined matters. Also, well-known functions or constructions are not described in detail since they would obscure the invention in unnecessary detail.

FIG. 1 is a flowchart of sequential steps of a related method for registration of an IDLC subscriber. As illustrated in FIG. 1, in order to open subscribers, an operator receives subscriber information inputted to an exchange in the form of a document or through a cable, and selects subscriber set data (S1). The operator creates a command for adding subscriber (S2), and transmits it to corresponding network elements (for example, access media gateway or subscriber transmission device) (S3). When signals reporting success of the command are received from the corresponding network elements (54), the operator confirms existence of another provision item (S5), and adds a subsequent subscriber.

If the skilled operator manually opens the subscribers one by one, it takes 5 hours to set up 512 subscribers. In addition, a verification process further increases time consumption. In addition, the operator may make mistakes which cause errors. As a result, a lot of time and manpower are required to open thousands to scores of thousands of subscribers.

Figure 2:
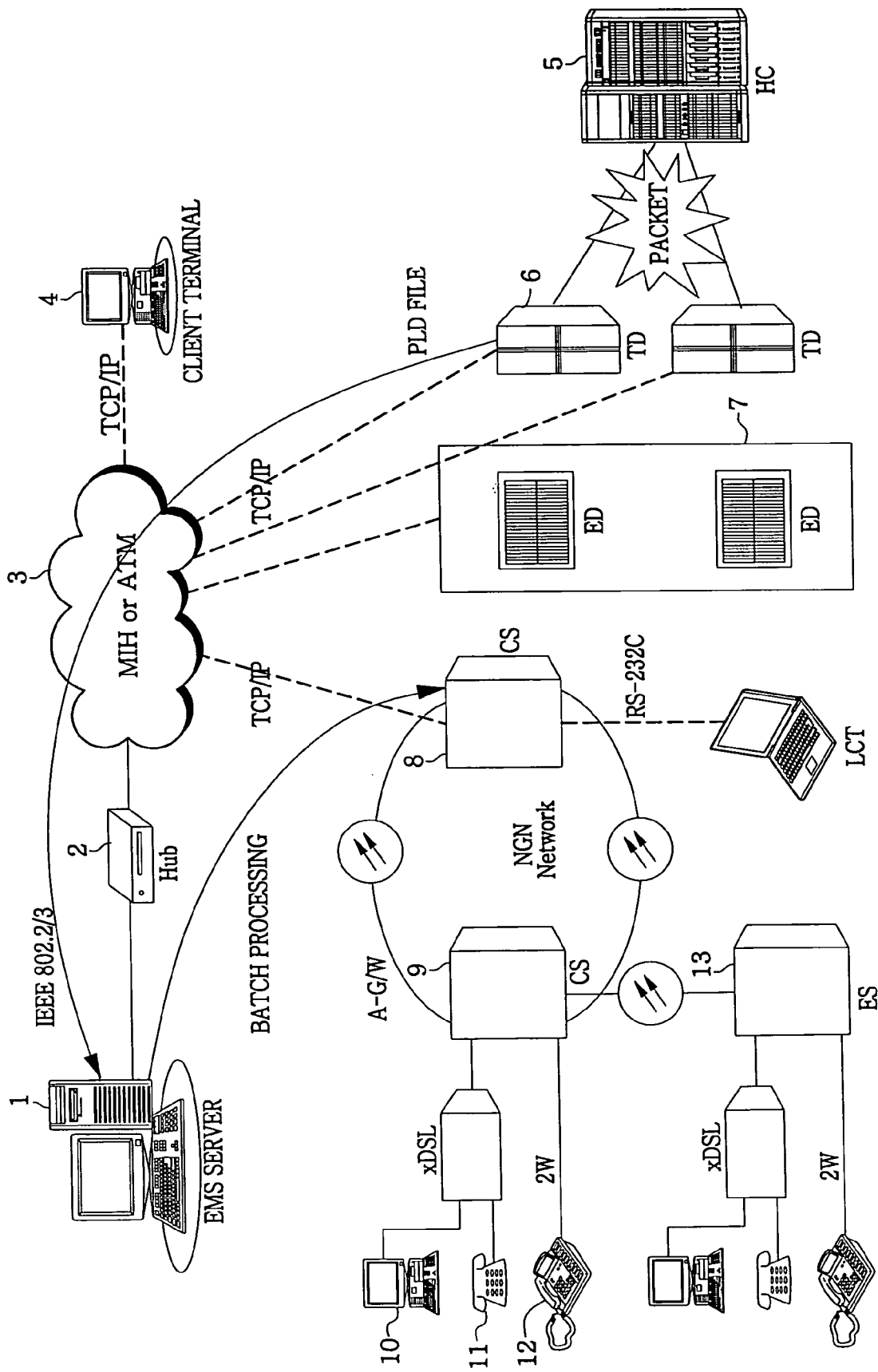
FIG. 2 is a structural view of a system for performing a method for batch registration of an IDLC subscriber using a PLD of an exchange in accordance with a preferred embodiment of the present invention.

FIG. 2 is a structural view of a system for performing a method for batch registration of an IDLC subscriber using a PLD of an exchange in accordance with a preferred embodiment of the present invention.

Referring to FIG. 2, a network to which the present invention is applied includes an EMS server 1 for performing the method for batch registration of an IDLC subscriber using the PLD of the exchange, a client terminal 4 accessing the EMS server 1 through a management information network (MIH) or ATM network 3 and a hub 2, TD exchanges 6, ED exchanges 7, and access media gateways 8, 9 and 13 to compose a next generation network (NGN). Here, a plurality of subscriber terminals 10, 11 and 12 are connected to the access media gateway 9 through an xDSL.

The EMS server 1 receives the PLD from the exchange, extracts subscriber information from the PLD, and performs a process for accepting corresponding subscribers in a new NGN gateway.

The client terminal 4 is connected to the MIH or ATM network 3 by using a TCP/IP. Therefore, an operator can access the EMS server 1 through the client terminal 4, and process a procedure for batch registration of an IDLC subscriber.

A V5 batch processing program is installed in the client terminal 4. The operator loads the V5 batch processing program, opens visual information for batch registration of subscriber, and accesses the EMS server 1.

The operator accessing the EMS server 1 reads the PLD of the exchange stored in the EMS server 1, receives shelf information relative to the access gateways 8, 9 and 13 from the EMS server 1, selects a specific shelf, and registers the subscribers recorded on the PLD file of the exchange in the selected shelf.

That is, the operator inputs input information to the screen of the client terminal 4 by referring to the visual information of the V5 batch processing program. According to the input information, the EMS server 1 opens its PLD file, extracts V5IDs and L3 addresses, and performs the process for registering the subscribers in the shelves of the access media gateways 8, 9 and 13.

The EMS server 1 displays the results of the execution on the screen of the client terminal 4 so that the operator can perform the proper operation when a series job is executed.

The TD exchanges 6 or ED exchanges 7 are connected to the MIH or ATM network 3 by using the TCP/IP. The TD exchanges 6 are connected to a host collector (HC) 5.

The TD exchanges 6 store information relative to the accepted subscribers in the form of a PLD file. The PLD file includes various information relative to each subscriber, such as V5IDs, L3 addresses and types of subscribers.

The EMS server 1 can extract the PLD from the TD exchanges 6 by using a file transfer protocol (FTP) or storing the PLD in a disk.

A program for batch registration of an IDLC subscriber is installed in the EMS server 1. This program is programmed to execute the following procedure:

A PLD file open step for opening a PLD file of an exchange selected by a client terminal accessing through a network, and listing and displaying information of subscribers included in the PLD file on a graphical user interface (GUI) of the client terminal; a network element information display step for displaying shelf information of an IDLC network element which will accept the subscribers included in the PLD file on the graphical user interface of the client terminal; a design step for receiving a shelf range in the displayed network element, and displaying it on the GUI of the client terminal, when a mode for designing subscriber constitution by shelves is selected; a subscriber designation step for receiving a range of list range to the subscribers who will be accepted in the shelf within the designated range among the subscribers, and displaying it on the GUI of the client terminal; and a batch registration step for transmitting a command for registering subscribers within the designated range in the shelf within the designated range, performing batch registration of subscriber for the corresponding shelf, receiving verification information for the registration of subscriber from the corresponding shelf, and displaying the result on the GUI of the client terminal.

Accordingly, when the EMS server 1 stores at least one exchange PLD data, if the installed program for batch registration of IDLC subscriber is loaded, the EMS server 1 performs the following functions on the client terminal accessing through the network:

Firstly, the EMS server 1 opens the PLD file of the exchange selected by the client terminal 4 linked with it through the network, and lists and displays information relative to subscriber included in the PLD file on the GUI of the client terminal 4.

Upon request from the client terminal 4, the EMS server 1 displays the shelf information of the IDLC network element which will accept the listed subscribers on the GUI of the client terminal 4.

Upon request from the client terminal 4, when the mode for designing subscriber constitution by shelves is selected, the EMS server 1 receives the shelf range in the displayed network element, and displays it on the GUI of the client terminal 4.

Upon request from the client terminal 4, the EMS server 1 receives the range of list for the subscribers who will be accepted in the shelf within the designated range among the listed subscribers, and displays it on the GUI of the client terminal 4.

Thereafter, the EMS server 1 transmits a command for registering the subscribers within 1s a designated range in the shelf within the designated range, performs batch registration of subscriber for the corresponding shelf, receives verification information for subscriber registration from the corresponding shelf, and displays the result on the GUI of the client terminal 4.

Figure 3:
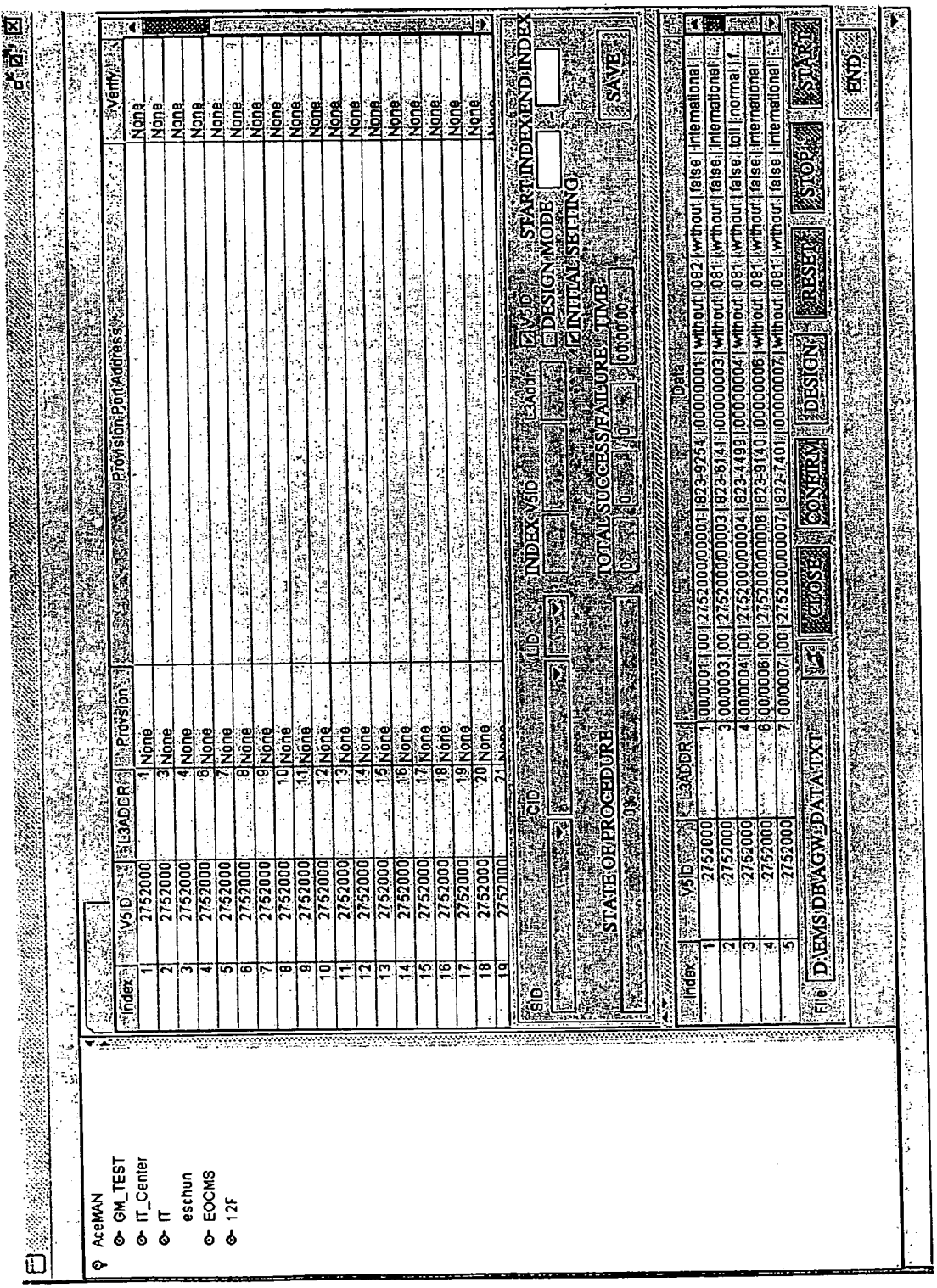
FIG. 3 is an exemplary view of a graphical user interface for performing the method for batch registration of an IDLC subscriber using the PLD of the exchange in accordance with the preferred embodiment of the present invention.

FIG. 3 is an exemplary view of the visual information which the EMS server 1 provides to the client terminal 4. The visual information can be displayed on the client terminal 4 or the EMS server 1. Based on the fact that the visual information is displayed on the client terminal 4, it can be recognized that the operator can remotely perform a series of processes through the network.

The visual information displayed on the client terminal 4 will now be explained with reference to FIG. 3.

Directory information relative to the shelf selected by the operator is displayed on the left side of the visual information. A window for selecting the PLD file is formed at the bottom side of the screen, and a file open button (not shown) and a file close button are selectively activated next to the window. A verify button, a design button, a reset button, a stop button and a start button are formed next to the file open or close button, and an end button is formed below the buttons.

A table showing the selected PLD is formed over the buttons. The PLD is categorized into indexes, V5IDs, L3 addresses (L3ADDR) and data, and listed by indexes. For reference, FIG. 5 is an exemplary view of a data source as one example of the PLD of FIG. 3.

Windows for selecting a shelf ID (SID), a card ID (CID) and a link ID (LID), and items for designating a specific index, V5ID and L3ADDR are formed at the top of the PLD table, and an icon for selecting automatic generation of V5ID, an icon for selecting a design mode and an icon for selecting initialization are formed next to the items. In addition, items for designating a start index and an end index are formed next to the icons. A bar for displaying a current state, windows for displaying a total number, a success number and a failure number, and a window showing consumed time are formed on the bottom.

List information relative to a subscriber is displayed at the top end of the screen. The V5ID and L3ADDR extracted from the PLD and displayed at the bottom of the screen, success/failure of the provision, provision port address and the verification item are aligned by indexes.

Each part of the visual information will now be briefly explained.

The operator selects the PLD file created in the exchange by pressing the file select button. The window for selecting the files is formed at the bottom of the screen so as to display names of the files which the operator can read by clicking. In FIG. 3, a txt file is exemplified.

After selecting the file, the operator opens the PLD file by pressing the file open button (not shown). When the file is opened, the file open button is automatically converted into a file close button. The V5ID, L3ADDR and original data extracted from the PLD are displayed on the bottom table, and the V5ID and L3ADDR are displayed on the top table.

On the other hand, when the V5ID does not exist, it is automatically generated. The function of automatically generating the V5ID confirms whether the V5ID exists in the selected shelf, and automatically generates the V5ID when it does not exist.

The method for batch registration is divided into two according to selection of the design mode. The design mode is selected when the user designs the subscriber constitution by shelves and performs batch registration. The design mode is activated only for this case.

(1) Designing Subscriber Constitution

The user drives a subscriber design screen by pressing the design button.

FIG. 4 is an exemplary view of the subscriber design screen. As depicted in FIG. 4, when the subscriber design screen is driven, a list of shelves composing selected network elements, a number of subscriber line unit (SLU) slots (mounted SLU and set SLU) set up in each shelf, and a total number of available ports are calculated and displayed.

Here, the user inputs all subscribers who he/she intends to set up by shelves. However, the number of the subscribers must be smaller than the total number of ports. When the user finishes inputting the subscribers, he/she stores data by pressing a store button.

If the user intends to start new design, he/she presses a new design button so that numbers of the previously-set subscribers and values of success/failure subscribers can be initialized. When the user finishes setting up the screen, he/she can close it.

(2) When Design Mode is Not Selected

In this case, the user performs a setup in two ways.

Firstly, when the user selects the initialization, he/she sequentially performs setting up from the first shelf of the selected NE, the first SLU card and the first port.

On the other hand, when the user does not select the initialization, he/she sequentially performs setup from the shelf, SLU card and port selected for setup.

Thereafter, the user performs a procedure for selecting set indexes. The user selects an index range by selecting the first to last indexes on the top table, or directly inputting index values to start and end index input items.

When the user selects a table, if he/she sets up the index range, the total numbers are automatically calculated and displayed, and when the user directly inputs the index values to the index field, the total numbers are calculated and displayed on the last index.

The user starts the setup. When the user presses a start button, set commands are sequentially transmitted to the respective subscribers according to the selected type, success/failure is displayed on the provision item, and position information is shown in the addresses. In case of failure, attempts are made three times, and then results are displayed.

When the user starts the setup, the start button is converted into a temporary stop button. When the user presses this button, the given command is executed, and then the process is temporarily intercepted. In order to resume the process, the user presses a resume button. If the user intends to completely stop the process, he/she presses a stop button.

When the whole process is finished, the total number of success/failure is displayed next to the total number. In the design mode, when the user presses a design button, he/she can confirm the number of success/failure for each shelf. When the user presses a reset button, a command for setting up the failure index in another port is executed. The reset process is performed in a state where the initialization is not selected. Therefore, the starting shelf, SLU and port must be designated in advance.

Figure 6B:
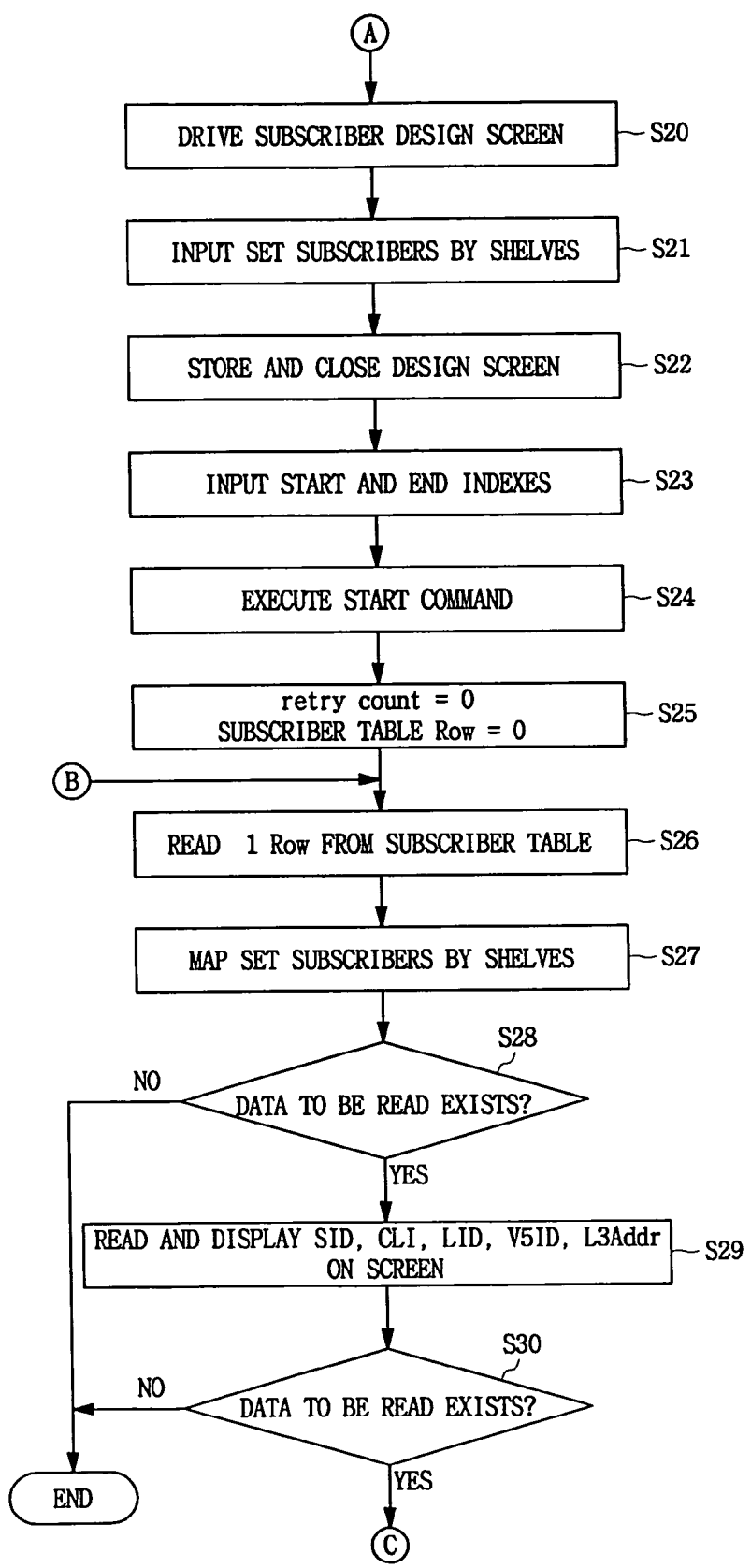
Figure 6C:
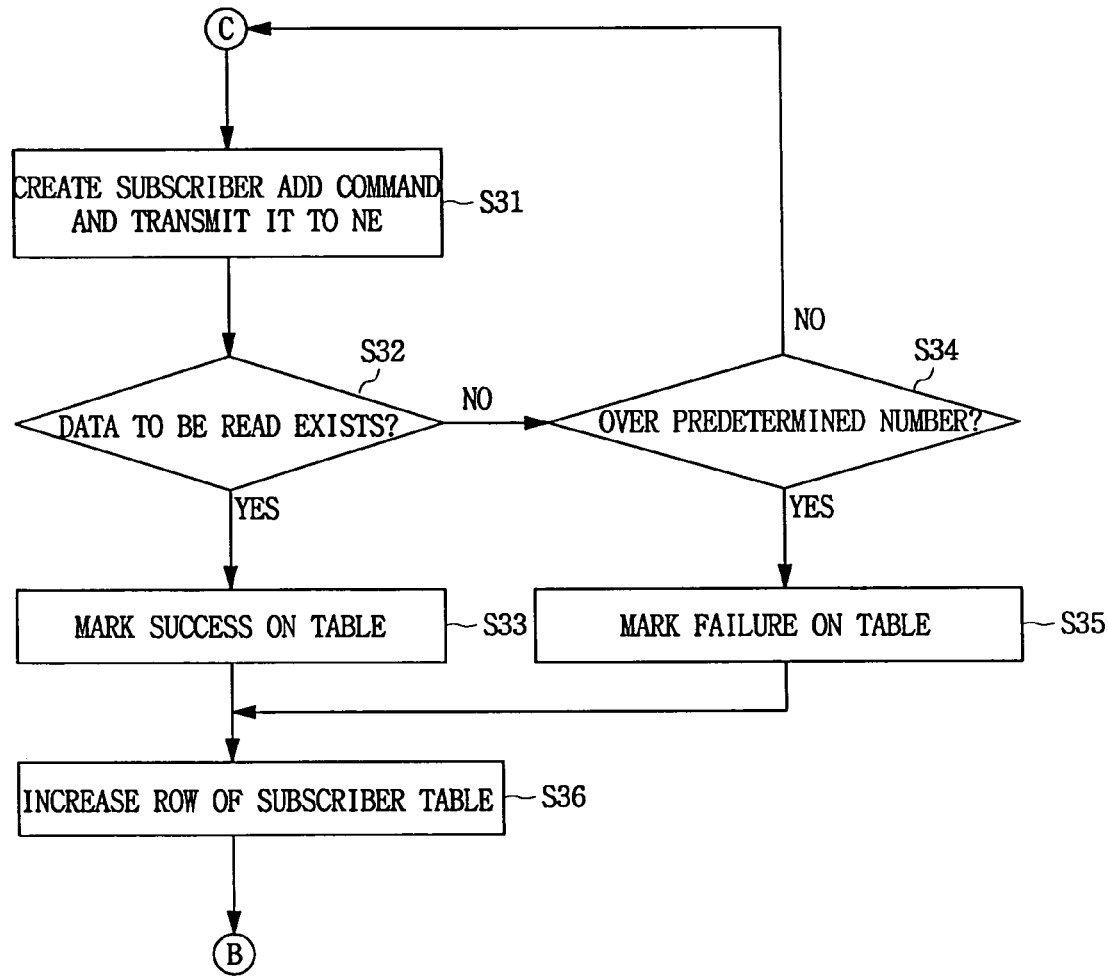

FIGS. 6A thru 6C are flowcharts showing sequential steps of the method for batch registration of IDLC subscriber using the PLD of the exchange in accordance with the preferred embodiment of the present invention. The method for batch registration of an IDLC subscriber using the PLD of the exchange will now be explained with reference to FIGS. 6A thru 6C.

The operator executes a V5 management program in the client terminal 4 (S11). The client terminal 4 is linked to the EMS server 1 for executing the subscriber batch processing menu (S12), and driving the V5.2 batch processing screen (S13).

The operator selects and opens the PLD file in the window for selecting the PLD file (S14). Then, the V5 management program reads the selected PLD file (S15), forms a table (S16), confirms whether the subscriber is a PSTN subscriber or general telephone subscriber, and adds a row to the table (S17). If the PLD includes 'coin', the operator considers the subscriber as a PSTN subscriber, and if not, V5 management program considers the subscriber as a general telephone subscriber.

PSTN subscribers and general telephone subscribers need to be distinguished because a signal reporting call rates must be transmitted to the PSTN subscribers when the subscribers are accepted in the new shelf. Accordingly, in the case of the PSTN subscriber of the exchange, the shelf allocated to the PSTN subscriber is allocated in the shelf of the transferred gateway.

Thereafter, the V5 management program extracts the V5ID and L3ADDR data from the PLD, adds a row to a subscriber set table, and displays it on the virtual information (S18).

The V5 management program confirms selection of the design button (S19). If the design button is selected, the V5 management program drives the subscriber design screen (S20). When the screen for subscriber design of FIG. 5 is displayed, the operator inputs set subscribers by shelves (S21), stores them, and closes the screen (S22).

In the menu screen, the operator inputs the start and end indexes of the provision subscribers of the subscriber information displayed on the top table (S23). After selecting the range of the provision subscribers, the operator executes the start command (S24). According to the start command, the V5 management program resets the count to '0' and resets the subscriber table to 'ROW=0' (S25). Then, V5 management program reads 1ROW from the subscriber table, and maps subscribers by shelves (S27). The V5 management program confirms whether further data to be read exists (S28). When the data to be read exists, the V5 management program reads SID, CLI, LID, V5ID and L3ADDR, and displays them on the screen (S29). Then, the V5 management program confirms whether further data to be read exists (S30).

If further data to be read does exist, the V5 management program creates and transmits a subscriber add command to the NE (S31). The V5 management program confirms whether the transmitted provision command is successful (S32), If the transmitted provision command is successful, 'success' is marked on the table (S33), and if not, the operator confirms whether the number of attempts exceeds a predetermined number (S34). If the number of the attempts does not exceed the predetermined number, the V5 management program re-transmits the subscriber add command to the NE (S31). On the other hand, if the number of attempts exceeds the predetermined number, 'failure' is marked on the table (S35). Thereafter, the V5 management program increases a row of the subscriber table (S36), and repeats the procedure in the row.

In accordance with the present invention, when the semielectronic exchange is replaced by the access media gateway, registration of an integrated digital loop carrier (IDLC) subscriber is performed by batch processing using the PLD of the semielectronic exchange, which reduces time consumption and increases precision.

In the related art, it takes about five hours for the skilled operator to register 512 subscribers. However, in accordance with the present invention, the batch processing function reduces the registration time to 3 minutes so that the operator can easily (with automatic conversion and setup), rapidly (higher rate by 100 times) and safely (without operator error and mistake) perform the process. Interception of the subscriber service is also minimized.

Moreover, the verified or set-failed subscribers are separately managed. As a result, the operator can directly handle errors in setting or resetting.

While the invention has been shown and described with reference to a certain preferred embodiment thereof, it will be understood by those skilled in the art that various changes in form and detail may be made therein without departing from the spirit and scope of the invention as defined by the appended claims.

What is claimed is:

1. A method for batch registration of an integrated digital loop carrier (IDLC) subscriber using program loaded data (PLD) of an exchange, comprising:
   (a) opening a program loaded data (PLD) file of an exchange selected by a client terminal accessing through a network, and listing and displaying, on a graphical user interface of the client terminal, information relative to subscribers included in the program loaded data (PLD) file;
   (b) displaying, on the graphical user interface of the client terminal, shelf information of an integrated digital loop carrier (IDLC) network element which will accept the subscribers included in the program loaded data (PLD) file;
   (c) receiving a shelf range in the displayed network element, and displaying the shelf range on the graphical user interface of the client terminal when a mode for designing subscriber constitution by shelves is selected;
   (d) receiving a list of a range of the subscribers who will be accepted in the shelf within a designated range of the subscribers, and displaying the list on the graphical user interface of the client terminal; and
   (e) transmitting a command for registering the subscribers within the designated range in the shelf within the designated range, performing batch registration of a subscriber for a corresponding shelf, receiving verification information for registration of the subscriber from the corresponding shelf, and displaying a result on the graphical user interface of the client terminal;
   wherein step (a) comprises the steps of:
   opening the program loaded data (PLD) file of the exchange, and storing the subscriber data in a memory in the form of a table;
   displaying the subscriber data stored in the table in a first area of the graphical user interface of the client terminal; and
   extracting and displaying, in a second area of the graphical user interface of the client terminal, V5IDs and L3 addresses of each subscriber from the subscriber data stored in the table.

2. The method of claim 1, wherein the table comprises subscriber information to enable an operator to search each subscriber data, confirm whether subscribers are public switched telephone network (PSTN) subscribers or general telephone subscribers, and display a result so as to register the subscribers in the corresponding shelf.

3. The method of claim 1, wherein step (b) comprises displaying a list of shelves of the element, a number of slots in a subscriber line unit set up in each shelf, and a total number of available ports.

4. A recording medium which is executed by a computer device, and which includes an electromagnetically-stored program for performing a method for batch registration of an integrated digital loop carrier (IDLC) subscriber using a program loaded data (PLD) of an exchange, said method comprising:

(a) opening a program loaded data (PLD) file of an exchange selected by a client terminal accessing through a network, and listing and displaying, on a graphical user interface of the client terminal, information relative to subscribers included in the program loaded data (PLD) file;

(b) displaying, on the graphical user interface of the client terminal, shelf information of an integrated digital loop carrier (IDLC) network element which will accept the subscribers included in the program loaded data (PLD) file;

(c) receiving a shelf range in the displayed network element, and displaying the shelf range on the graphical user interface of the client terminal when a mode for designing subscriber constitution by shelves is selected;

(d) receiving a list of a range of the subscribers who will be accepted in the shelf within a designated range of the subscribers, and displaying the list on the graphical user interface of the client terminal; and (e) transmitting a command for registering the subscribers within the designated range in the shelf within the designated range, performing batch registration of a subscriber for a corresponding shelf, receiving verification information for registration of the subscriber from the corresponding shelf, and displaying a result on the graphical user interface of the client terminal;

wherein step (a) comprises the steps of:

opening the program loaded data (PLD) file of the exchange, and storing the subscriber data in a memory in the form of a table;

displaying the subscriber data stored in the table in a first area of the graphical user interface of the client terminal; and extracting and displaying, in a second area of the graphical user interface of the client terminal, V5IDs and L3 addresses of each subscriber from the subscriber data stored in the table.

5. The recording medium of claim 4, wherein the table comprises subscriber information to enable an operator to search each subscriber data, confirm whether subscribers are public switched telephone network (PSTN) subscribers or general telephone subscribers, and display a result so as to register the subscribers in the corresponding shelf.

6. The recording medium of claim 4, wherein step (b) comprises displaying a list of shelves of the element, a number of slots in a subscriber line unit set up in each shelf, and a total number of available ports.

7. An element management system server, comprising:

storing and display means for storing at least one exchange program loaded data (PLD), for opening a program loaded data (PLD) file of an exchange selected by a client terminal linked to the server through a network, and for listing and displaying, on a graphical user interface of the client terminal, information relative to subscribers included in the program loaded data (PLD) file according to input information from the client terminal;

display means for displaying, on the graphical user interface of the client terminal, shelf information of an integrated digital loop carrier (IDLC) network element which will accept the subscribers included in the program loaded data (PLD) file;

receiving and displaying means for receiving a shelf range in the displayed network element, and for displaying the shelf range on the graphical user interface of the client terminal when a mode for designing subscriber constitution by shelves is selected;

additional receiving and displaying means for receiving a list of a range of the subscribers who will be accepted in the shelf within a designated range of the listed subscribers, and for displaying the list on the graphical user interface of the client terminal; and transmitting means for transmitting a command for registering the subscribers within the designated range in the shelf within the designated range, for performing batch registration of a subscriber for a corresponding shelf, for receiving verification information for registration of the subscriber from the corresponding shelf, and for displaying a result on the graphical user interface of the client terminal;

wherein the storing and display means opens the program loaded data (PLD) file of the exchange, stores the subscriber data in a memory in the form of a table, displays the subscriber data stored in the table in a first area of the graphical user interface of the client terminal, and extracts and displays, in a second area of the graphical user interface of the client terminal V5IDs and L3 addresses of each subscriber from the subscriber data stored in the table.

8. The element management system server of claim 7, wherein the table comprises subscriber information to enable an operator to search each subscriber data, confirm whether subscribers are public switched telephone network (PSTN) subscribers or general telephone subscribers, and display a result so as to register the subscribers in the corresponding shelf.

9. The element management system server of claim 7, wherein the display means displays a list of shelves of the element, a number of slots in a subscriber line unit set up in each shelf, and a total number of available ports.

* * * * *